US009193639B2

(12) United States Patent
Bradford et al.

(10) Patent No.: US 9,193,639 B2
(45) Date of Patent: Nov. 24, 2015

(54) METHODS OF MANUFACTURING MONOLITHIC GENERANT GRAINS

(75) Inventors: Roger Bradford, Malad, ID (US); Thomas Cronin, Ogden, UT (US); Ivan Mendenhall, Providence, UT (US); Brett Hussey, Bountiful, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 1753 days.

(21) Appl. No.: 11/691,753

(22) Filed: Mar. 27, 2007

(65) Prior Publication Data
US 2008/0236711 A1 Oct. 2, 2008

(51) Int. Cl.
| D03D 23/00 | (2006.01) |
| D03D 43/00 | (2006.01) |
| C06B 45/00 | (2006.01) |
| B01J 2/22 | (2006.01) |
| C06B 21/00 | (2006.01) |
| C06D 5/06 | (2006.01) |

(52) U.S. Cl.
CPC . *C06B 45/00* (2013.01); *B01J 2/22* (2013.01); *C06B 21/0041* (2013.01); *C06D 5/06* (2013.01)

(58) Field of Classification Search
USPC .......................................... 149/109.6, 109.4
See application file for complete search history.

(56) References Cited

U.S. PATENT DOCUMENTS

| 2,921,521 A | 1/1960 | La Haye et al. .......... 102/39 |
| 3,255,281 A | 6/1966 | Alexander ................ 264/3 |
| 3,722,354 A | 3/1973 | Herty, III ................ 86/1 |
| 3,724,870 A | 4/1973 | Kurokawa et al. ........ 280/150 |
| 3,986,908 A | 10/1976 | Grebert et al. ............ 149/19.7 |
| 4,000,231 A * | 12/1976 | Peterson ................... 264/411 |
| 4,099,376 A | 7/1978 | Japs ......................... 60/253 |
| 4,131,051 A | 12/1978 | Schaffling ................ 86/1 R |

(Continued)

FOREIGN PATENT DOCUMENTS

| DE | 3933555 | 2/1991 |
| DE | 4006741 | 8/1991 |

(Continued)

OTHER PUBLICATIONS

International Application No. PCT/US2008/002654 International Search Report issued Sep. 18, 2008 (4 pages).

(Continued)

*Primary Examiner* — James McDonough
(74) *Attorney, Agent, or Firm* — Harness, Dickey & Pierce, P.L.C.

(57) ABSTRACT

Methods for making a pressed monolithic gas generant for an inflatable restraint device (for example, an airbag system for a vehicle) are provided. The methods include admixing a gas generant material with a ballistic performance modifier to form a mixture. The mixture is granulated. Then, a pressed monolithic gas generant grain is formed by applying pressure to the granulated mixture, where the grain has an actual density of at least about 95% of the maximum theoretical density. The pressure may be applied in a controlled manner to both side of the gas generant material in a die cavity, and removing formed grain from die cavity while maintaining some pressure to both sides of the grain, thereby further improving various pyrotechnic properties. The methods of the disclosure provide pyrotechnic compositions that are economical to manufacture, have improved burn rate, combustion profile, effluent quality, strength, durability, and integrity of the grain, while having a consistent shape between different production lots.

26 Claims, 6 Drawing Sheets

(56) References Cited

U.S. PATENT DOCUMENTS

| | | | |
|---|---|---|---|
| 4,246,051 A | 1/1981 | Garner et al. | |
| 4,300,962 A | 11/1981 | Stinechipher et al. | |
| 4,349,324 A | 9/1982 | Neff et al. | 425/149 |
| 4,624,126 A | 11/1986 | Avila et al. | 72/453 |
| 4,640,711 A | 2/1987 | Lichti et al. | 75/248 |
| 4,698,107 A | 10/1987 | Goetz et al. | |
| 4,714,579 A | 12/1987 | Boden et al. | 264/328 |
| 4,806,180 A | 2/1989 | Goetz et al. | |
| 4,817,828 A | 4/1989 | Goetz | 222/3 |
| 4,828,474 A | 5/1989 | Ballantyne | 425/150 |
| 4,846,368 A | 7/1989 | Goetz | |
| 4,923,512 A | 5/1990 | Timm et al. | 75/239 |
| 4,944,528 A | 7/1990 | Nilsson et al. | 280/741 |
| 4,998,751 A | 3/1991 | Paxton | |
| 5,019,220 A | 5/1991 | Taylor et al. | |
| 5,034,070 A | 7/1991 | Goetz et al. | |
| 5,051,143 A | 9/1991 | Goetz | |
| 5,202,067 A * | 4/1993 | Solazzi et al. | 264/40.5 |
| 5,351,619 A * | 10/1994 | Chan et al. | 102/289 |
| 5,407,608 A | 4/1995 | Knowlden et al. | |
| 5,423,261 A | 6/1995 | Bernardy et al. | |
| 5,507,520 A | 4/1996 | Meduvsky et al. | 280/741 |
| 5,518,054 A | 5/1996 | Mitson et al. | 149/35 |
| 5,531,941 A | 7/1996 | Poole | |
| 5,538,568 A | 7/1996 | Taylor et al. | 149/70 |
| 5,542,704 A | 8/1996 | Hamilton et al. | |
| 5,562,303 A | 10/1996 | Schleicher et al. | 280/736 |
| 5,608,183 A | 3/1997 | Barnes et al. | |
| 5,623,115 A | 4/1997 | Lauritzen et al. | 102/288 |
| 5,629,494 A | 5/1997 | Barnes et al. | 149/36 |
| 5,635,668 A | 6/1997 | Barnes et al. | |
| 5,670,740 A | 9/1997 | Barnes et al. | |
| 5,738,374 A | 4/1998 | Marsaud et al. | 280/741 |
| 5,756,930 A | 5/1998 | Chan et al. | |
| 5,804,758 A | 9/1998 | Marsaud et al. | 102/288 |
| 5,879,421 A | 3/1999 | Liu et al. | |
| 5,989,367 A | 11/1999 | Zeuner et al. | |
| 6,007,736 A | 12/1999 | Zhang et al. | 252/187 |
| 6,029,994 A | 2/2000 | Perotto et al. | 280/736 |
| 6,032,979 A | 3/2000 | Mossi et al. | 280/741 |
| 6,039,820 A * | 3/2000 | Hinshaw et al. | 149/45 |
| 6,053,110 A | 4/2000 | Marchant et al. | |
| 6,103,030 A | 8/2000 | Taylor et al. | |
| 6,129,023 A | 10/2000 | Marsaud et al. | 102/288 |
| 6,132,480 A | 10/2000 | Barnes et al. | 44/314 |
| 6,132,537 A | 10/2000 | Zeuner et al. | |
| 6,143,102 A * | 11/2000 | Mendenhall et al. | 149/45 |
| 6,156,136 A | 12/2000 | Bottaro et al. | |
| 6,205,916 B1 | 3/2001 | Castleton | 100/35 |
| 6,224,697 B1 | 5/2001 | Mendenhall et al. | |
| 6,301,935 B1 | 10/2001 | Audenaert et al. | |
| 6,315,930 B1 | 11/2001 | Hamilton | 264/3 |
| 6,322,649 B1 | 11/2001 | Marsaud et al. | 149/10 |
| 6,368,434 B1 | 4/2002 | Espagnacq et al. | |
| 6,427,599 B1 * | 8/2002 | Posson et al. | 102/336 |
| 6,517,647 B1 | 2/2003 | Yamato | 149/45 |
| 6,550,808 B1 | 4/2003 | Mendenhall | |
| 6,592,691 B2 | 7/2003 | Taylor et al. | |
| 6,605,233 B2 | 8/2003 | Knowlton et al. | |
| 6,634,302 B1 | 10/2003 | Rink et al. | 102/530 |
| 6,689,237 B1 | 2/2004 | Mendenhall | 149/36 |
| 6,712,918 B2 | 3/2004 | Mendenhall et al. | 149/36 |
| 6,752,939 B2 * | 6/2004 | Gereg | 264/40.1 |
| 6,789,485 B2 | 9/2004 | Moquin et al. | 102/530 |
| 6,843,869 B2 | 1/2005 | Mendenhall et al. | 149/109 |
| 6,905,562 B2 | 6/2005 | Hamilton | 149/40 |
| 6,935,655 B2 | 8/2005 | Longhurst et al. | 280/736 |
| 6,941,868 B2 | 9/2005 | Herget | 102/205 |
| 6,958,101 B2 | 10/2005 | Mendenhall et al. | |
| 6,984,398 B2 | 1/2006 | Brennan et al. | 424/464 |
| 7,024,342 B1 | 4/2006 | Waite et al. | 703/6 |
| 7,077,428 B2 | 7/2006 | Barker et al. | |
| 7,147,733 B2 | 12/2006 | Barnes et al. | |
| 7,470,337 B2 | 12/2008 | Mendenhall et al. | |
| 2002/0195181 A1 | 12/2002 | Lundstrom et al. | 149/19 |
| 2003/0037850 A1 | 2/2003 | Helmy et al. | |
| 2003/0089883 A1 * | 5/2003 | Knowlton et al. | 252/181.1 |
| 2004/0000362 A1 | 1/2004 | Sato et al. | |
| 2004/0050283 A1 | 3/2004 | Daoud | |
| 2004/0112244 A1 | 6/2004 | Barker et al. | |
| 2004/0154712 A1 | 8/2004 | Yokoyama et al. | |
| 2004/0173922 A1 | 9/2004 | Barnes et al. | |
| 2004/0216820 A1 | 11/2004 | Mendenhall et al. | |
| 2005/0115721 A1 * | 6/2005 | Blau et al. | 169/5 |
| 2005/0263223 A1 | 12/2005 | Halpin et al. | 149/19 |
| 2006/0005734 A1 * | 1/2006 | McCormick | 102/530 |
| 2006/0016529 A1 | 1/2006 | Barnes et al. | 149/45 |
| 2006/0054257 A1 | 3/2006 | Mendenhall et al. | |
| 2006/0102259 A1 | 5/2006 | Taylor et al. | |
| 2007/0240797 A1 | 10/2007 | Mendenhall et al. | 149/45 |
| 2007/0296190 A1 * | 12/2007 | Hussey et al. | 280/741 |
| 2008/0236711 A1 | 10/2008 | Bradford et al. | |
| 2009/0044885 A1 | 2/2009 | Brisighella et al. | |
| 2009/0044886 A1 | 2/2009 | Brisighella et al. | |
| 2009/0255611 A1 | 10/2009 | Lund et al. | |

FOREIGN PATENT DOCUMENTS

| | | |
|---|---|---|
| DE | 19501889 | 7/1995 |
| DE | 4318883 | 12/2003 |
| EP | 0324639 | 7/1989 |
| EP | 0757026 | 6/1996 |
| EP | 0728630 | 8/1996 |
| EP | 0870746 | 4/1998 |
| EP | 0767155 | 8/2000 |
| EP | 1142853 | 10/2001 |
| FR | 2873367 | 1/2006 |
| GB | 2219242 | 12/1989 |
| WO | WO 89/10257 | 11/1989 |
| WO | WO 99/05079 | 2/1999 |
| WO | WO 01/08937 | 2/2001 |
| WO | WO 03/106378 | 12/2003 |
| WO | WO 2004/024653 | 3/2004 |
| WO | WO 2004/067477 | 8/2004 |
| WO | WO 2006/134311 | 12/2006 |
| WO | WO 2007/042735 | 4/2007 |
| WO | WO 2007/113299 | 10/2007 |
| WO | WO 2007/149173 | 12/2007 |
| WO | WO 2008/035288 | 3/2008 |
| WO | WO 2008/118273 | 10/2008 |
| WO | WO 2009/023119 | 2/2009 |
| WO | WO 2009/126182 | 10/2009 |
| WO | WO 2009/126702 | 10/2009 |

OTHER PUBLICATIONS

International Application No. PCT/US2008/002654 Written Opinion of the International Searching Authority (9 pages).

"Extrusion Process," [online]; [retrieved on Oct. 6, 2006], retrieved from http://www.aec.org/techinfo/prntFriend/expro_prntfrnd.html, 4 pp.

"Refinement of tablet compaction models to include compaction kinematics," [online]; [retrieved on Sep. 18, 2006], retrieved from http://www.msm.cam.ac.uk/ccmm/projects/lhh24.html, 6 pp.

"The Use of MADYMO to Elucidate Injury Mechanisms in a Complex, Multiple-Impact Collision," [online]; [retrieved on Feb. 5, 2008], retrieved from http://www-nrd.nhtsa.dot.gov/pdf/nrd-50/ciren/2002/0802fairfax.pdf, 32 pp.

* cited by examiner

METHODS OF MANUFACTURING MONOLITHIC GENERANT GRAINS

FIELD

The present disclosure relates to inflatable restraint systems and more particularly to methods of manufacturing pyrotechnic gas generant materials for use in such systems.

BACKGROUND

The statements in this section merely provide background information related to the present disclosure and may not constitute prior art.

Passive inflatable restraint systems are often used in a variety of applications, such as in motor vehicles. When a vehicle decelerates due to a collision, an inflatable restraint system deploys an airbag cushion to prevent contact between the occupant and the vehicle, thus minimizing occupant injuries. Such devices usually employ an inflator that can include a pyrotechnic gas generant. The gas generants burn very rapidly to generate heated gas that inflates an airbag, thereby restraining the occupant relative to the vehicle.

Vehicle occupants may not be in a predetermined position to receive the complete benefits of airbag deployment. If the rate of pressure increase in the airbag is too rapid and the amount of pressure generated by the gas generant is excessive, then an out-of-position occupant may not receive the desired benefits of the airbag. There is an ever growing demand to improve airbag performance and safety, as well as a need to reduce manufacturing and production costs. Accordingly, there is a need for increasing the functionality of the propellant or gas generant used in airbag inflators, while reducing the cost of the gas generant and entire airbag inflator system.

Improvements in gas generant performance remain desirable. Tailoring the performance of the gas generant in an inflatable device system, such as an airbag, can require a complex design of not only the gas generant, but also hardware systems that control gas flow. It is preferred that gas generants for inflators of inflatable restraint devices rapidly generate gases during combustion at desired pressure levels and rates to achieve superior performance and to improve out-of-position performance. Likewise, gas generant materials are preferably safe for handling, have high gas yields and acceptable flame temperatures, with burning rates appropriate to the generant web thickness. Gas generants that fulfill these requirements and further minimize the production of byproduct compounds in effluent gases released through the airbag are highly desirable.

SUMMARY

According to various aspects of the present disclosure, a method is provided for forming a monolithic gas generant. In certain aspects, a gas generant material is admixed with a ballistic performance modifier to form a mixture, which is then granulated. The method further comprises forming a pressed monolithic gas generant grain by applying pressure to the granulated mixture, where the pressed monolithic gas generant grain has an actual density of at least about 95% of the maximum theoretical density of the gas generant.

In other aspects, the disclosure provides a method for forming a monolithic gas generant comprising introducing a gas generant material into a die cavity. The die cavity has a first side and a second side opposite to the first side. Pressure is applied to the gas generant material along both the first and the second sides to form a pressed monolithic grain that has an actual density of greater than or equal to about 95% of the maximum theoretical mass density of the gas generant material. The pressed monolithic grain is ejected from the die by applying a greater pressure on the first side to force the grain from the die, while maintaining applied pressure on the second side during at least a portion of the ejecting, where the applied pressure is greater than or equal to about 3,000 psig (pounds per square inch gauge) (about 21 MPa).

According to other aspects, the present disclosure provides a method for forming a monolithic gas generant. The gas generant material is admixed with a ballistic performance modifier to form a mixture. The mixture is compacted with an applied pressure of at least about 40,000 psi on generant. The mixture is granulated. A pressed monolithic gas generant grain is formed by applying pressure of greater than about 70,000 psi (about 480 MPa) to the granulated mixture, where the pressed monolithic gas generant grain has an initial surface area of less than about 13,000 mm$^2$, wherein a product of a mass density and a gas yield of the gas generant is greater than or equal to about 5.0 moles/100 cm$^3$. The gas generant grain is substantially free of polymeric binder and has an actual density of at least about 95% of the maximum theoretical density of the gas generant.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

Figure 1:
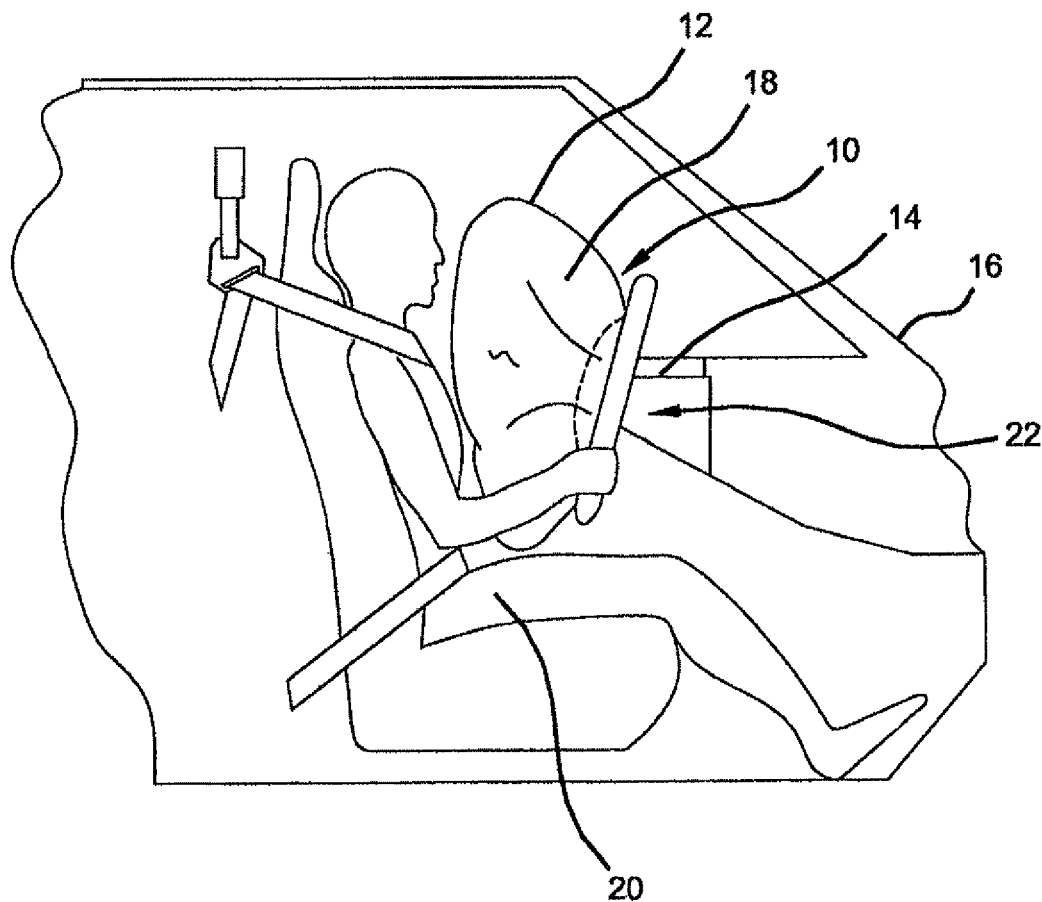
FIG. 1 is a simplified partial side view of an exemplary passive inflatable airbag device system in a vehicle having an occupant.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

Inflatable restraint devices preferably generate gas in situ from a reaction of a pyrotechnic gas generant contained therein. In accordance with various aspects of the present disclosure, gas generants are formed that have desirable compositions and shapes that result in superior performance characteristics in an inflatable restraint device. In various aspects, the disclosure provides methods of making monolithic gas generant grains that have a high burn rate (i.e., rate of combustion reaction), a high gas yield (moles/mass of generant), a high achieved mass density, a high theoretical density, and a high loading density. In certain aspects, the monolithic gas generants are substantially free of polymeric binder and have a high density. Such monolithic gas generant grains are formed in unique shapes that optimize the ballistic burning profiles of the materials contained therein.

By way of background, inflatable restraint devices have applicability for various types of airbag module assemblies for automotive vehicles, such as driver side, passenger side, side impact, curtain and carpet airbag assemblies, for example, as well as with other types of vehicles including, for example, boats, airplanes, and trains. Such pyrotechnic gas generants can also be used in other applications where rapid generation of gas is required, such as seat belt restraints, for example.

As discussed herein, exemplary inflatable restraint devices will be referred to as airbag assemblies for purposes of illustration. FIG. 1 shows an exemplary driver-side front airbag inflatable restraint device 10. Such driver side, inflatable restraint devices typically comprise an airbag cushion 12 that is stored within a steering column 14 of a vehicle 16. A gas generant contained in an inflator (not shown) in the steering column 14 creates rapidly expanding gas 18 that inflates the airbag 12. The airbag 12 deploys within milliseconds of detection of deceleration of the vehicle 16 and creates a barrier between a vehicle occupant 20 and the vehicle components 22, thus minimizing injuries.

Inflatable restraint devices typically involve a series of reactions, which facilitate production of inflation gas to deploy the airbag. Upon actuation of the entire airbag assembly system, the airbag cushion should begin to inflate within the course of a few milliseconds.

Figure 2:
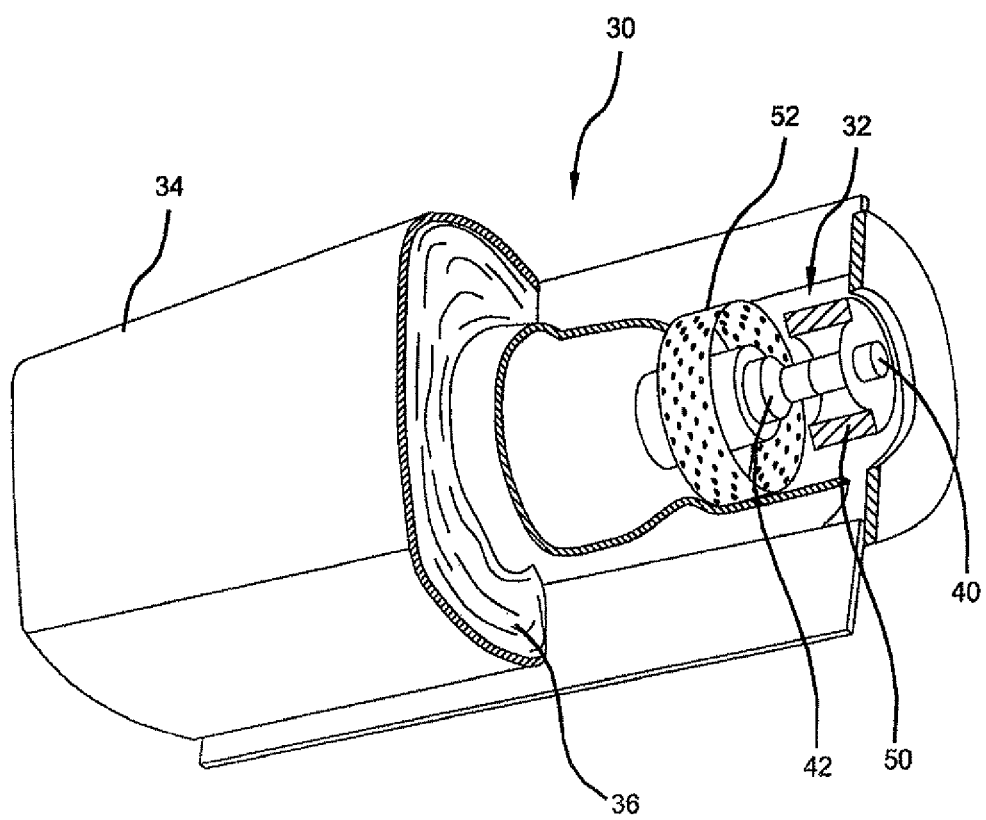
FIG. 2 is a partial cross-sectional view of an exemplary passenger-side airbag module including an inflator for an inflatable airbag restraint device.

FIG. 2 shows a simplified exemplary airbag module 30 comprising a passenger compartment inflator assembly 32 and a covered compartment 34 to store an airbag 36. Such devices often use a squib or initiator 40 which is electrically ignited when rapid deceleration and/or collision is sensed. The discharge from the squib 40 usually ignites an igniter material 42 that burns rapidly and exothermically, in turn, igniting a gas generant material 50. The gas generant material 50 burns to produce the majority of gas products that are directed to the airbag 36 to provide inflation.

In various embodiments, a gas generant 50 is a solid grain that comprises a pyrotechnic material. The pyrotechnic material consists of a fuel, an oxidizer, and other minor ingredients that when ignited combust rapidly to form gaseous reaction products (for example, $CO_2$, $H_2O$, and $N_2$). Gas generants are also known in the art as propellants. Thus, a gas generant material comprises one or more compounds (e.g., raw materials) that are combined into a unitary structure that when ignited undergo rapid combustion reaction(s) forming heat and gaseous products, i.e., the gas generant 50 burns to create heated inflation gas for an inflatable restraint device.

In various embodiments, a gas generant 50 is a solid grain that comprises a pyrotechnic material. It is desirable to formulate the gas generant composition such that the solid combustion products form a unitary, easily filterable mass, sometimes referred to as a clinker, during combustion. The clinker often serves to sequester various particulates. However, a filter 52 is often additionally provided between the gas generant 50 and airbag 36 to remove particulates entrained in the gas and to reduce gas temperature of the gases prior to entering the airbag 36. The quality and toxicity of the components of the gas produced by the gas generant 50, also referred to as effluent, are important because occupants of the vehicle may be potentially exposed to these compounds. Therefore, it is desirable to minimize the concentration of potentially harmful compounds in the effluent.

Figure 3:
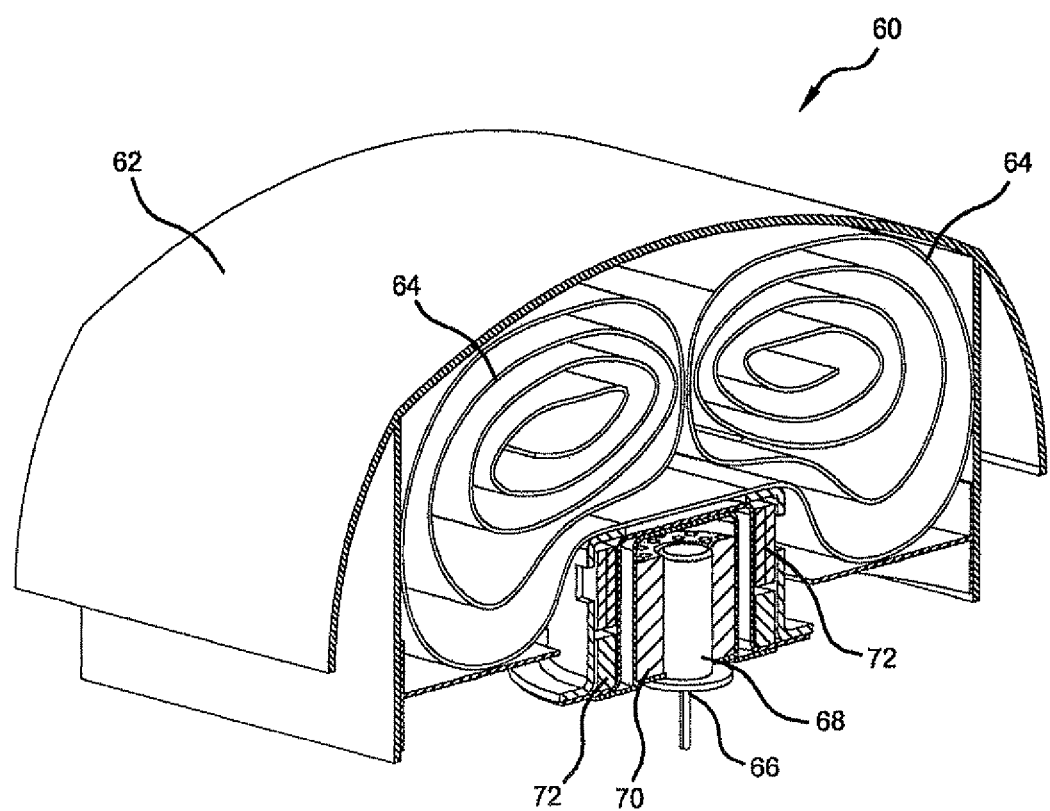
FIG. 3 is a partial cross-sectional view of an exemplary driver-side airbag module including an inflator for an inflatable airbag restraint device.

FIG. 3 shows a simplified exemplary driver side airbag module 60 with a covered compartment 62 to store an airbag 64. A squib 66 is centrally disposed within an igniter material 68 that burns rapidly and exothermically, in turn, igniting a gas generant material 70. Filters 72 are provided to reduce particulate in effluent gases entering the airbag 64 as it inflates.

Various different gas generant compositions (50 or 70) are used in vehicular occupant inflatable restraint systems. As described above, gas generant material selection involves various factors, including meeting current industry performance specifications, guidelines and standards, generating safe gases or effluents, handling safety of the gas generant materials, durational stability of the materials, and cost-effectiveness in manufacture, among other considerations. It is preferred that the gas generant compositions are safe during handling, storage, and disposal, and preferably are azide-free. In certain aspects, the present disclosure provides methods of making pressed monolithic gas generant grains that have a high density, strength to withstand environmental conditions and ignition, a consistency of shape from grain to grain, and further lack flaws in the grain such as cracks, chips, voids, and the like.

The ballistic properties of a gas generant, such as 50 or 70 shown in FIGS. 2 and 3, are typically controlled by the gas generant material composition, shape and surface area, as well as the burn rate of the material. Conventional gas generant materials comprise at least one fuel, an oxidizer, and at least one binder, such as a polymeric binder. Binders are typically mixed with the various constituents of the gas generant. Binders often serve to retain the shape of and to prevent the fracture of the gas generant solids during storage and use, particularly when they are formed via extrusion and/or molding. For example, a dry blended mixture of various gas generant raw material components can be mixed with a liquid binder resin, extruded, and then cured. Alternatively, solid polymeric binder particles can be dissolved in a solvent or heated to the melting point, then mixed with other gas generant components and extruded or molded. However, gas generant solids formed by such methods are only subjected to relatively low to moderate compressive forces due to the nature of the manufacturing methods and relative compressive force applied.

Most of the above described formation methods require a binder, such as polymeric binders, including organic film formers, inorganic polymers, thermoplastic and/or thermoset polymers. Examples of common polymeric binders include, but are not limited to: natural gums, cellulosic esters, polyacrylates, polystyrenes, silicones, polyesters, polyethers, polybutadiene, and the like.

The presence of polymeric binders in conventional gas generants poses several potential issues. First, during the combustion of the fuel and oxidizer, the binder is likewise burned, which requires additional oxidizer to prevent formation of undesirable byproducts in the gas effluent. Use of additional oxidizer reduces the gas yield of the composition and combustion of polymeric materials increases combustion temperature, both undesirable consequences. Second, binder resin is a diluent and slows otherwise rapid reaction of the chemical materials in the gas generant. In some circumstances, the burning rate of gas generants having certain binders is so severely compromised that monolithic shapes have previously not been industrial practicable. Since the presence of the binder slows the rate of reaction of the gas generant, other compounds are often added to compensate for the binder (thereby boosting the reaction rate). These additives include co-oxidants, such as perchlorate-containing oxidants, which create unfilterable particulates in the effluent.

In accordance with certain aspects of the present disclosure, the gas generant materials are substantially free of polymeric binder. The term "substantially free" as referred to herein be intended to mean that the compound is absent to the extent that that undesirable and/or detrimental effects are negligible or nonexistent. In the present embodiment, a gas generant that is "substantially free" of polymeric binder comprises less than about 5% by weight polymeric binder, more preferably less than about 4% by weight, optionally less than about 3% by weight, optionally less than about 2% by weight, optionally less than about 1% by weight polymeric binder, and in certain embodiments comprises 0% by weight of the polymeric binder. The gas generant compositions formed in accordance with the principles of the present disclosure thus avoid production of undesirable byproduct species potentially generated in effluent by the burning of the polymeric binder resins as the gas generant burns. Further, gas generants that are substantially free of polymeric binders have significantly improved burn characteristics (i.e., higher burning rate).

In various aspects, the methods of the present disclosure provide gas generant materials that are monolithic pressed grain shapes having a high density. In forming the gas generant grains, raw materials are mixed and then processed. The variability in raw material properties of the various components of the gas generant can potentially result in variability in the gas generant grain, which in turn can potentially cause inconsistent ballistic performance. In certain types of formation processes, this inherent lot to lot variation in performance can be adjusted by simply adjusting gas generant load or thickness. However, for monolithic pressed grains, there are potential concerns that monolithic pressed grains lack "tunability" or an inability to compensate for inherent lot to lot variation in performance. However, the present disclosure provides methods of forming monolithic gas generant grains by flexible manufacturing processes that account for such potential variations from manufacturing.

Thus, the methods of the present disclosure provide gas generant materials that are monolithic pressed grain shapes that have a high density, for example, and have an actual density that is greater than or equal to about 90% of the maximum theoretical density of the gas generant. According to certain aspects of the present disclosure, the actual density is greater than or equal to about 93%, more preferably greater than about 95% of the maximum theoretical density, and even more preferably greater than about 97% of the maximum theoretical density. In some embodiments, the actual density exceeds about 98% of the maximum theoretical density of the gas generant material. Such high actual mass densities in gas generant materials are obtained in certain methods of forming gas generant grains in accordance with various aspects of the present disclosure, where high compressive force is applied to gas generant raw materials that are substantially free of binder.

While not limiting as to any particular theory by which the teachings of the present disclosure operate, it is believed that a high actual density as compared to the theoretical mass density is important because the pressed gas generant grain holds its shape during combustion (rather than fracturing and/or pulverizing), which assists in maintaining desirable performance characteristics, such as progressive surface area exposure, burn profile, combustion pressure, and the like. These aspects of performance improve both out-of-position occupant performance and eliminate the need for a two-stage driver inflatable restraint device assembly, as will be described in more detail below.

In certain aspects, the pressed monolithic grains formed by the methods of the present disclosure have a loading density of the gas generant that is relatively high; otherwise a low performance for a given envelope may result. A loading density is an actual volume of generant material divided by the total volume available for the shape. In accordance with various aspects of the present disclosure, the gas generant grains have a loading density for the gas generant that is greater than or equal to about 60%, optionally greater than or equal to about 62%. In certain aspects, a gas generant has a loading density of about 62 to about 63%.

In various aspects, a method for forming a pressed monolithic gas generant grain is provided. Generally, such a method includes admixing a gas generant material with a ballistic performance modifier to form a mixture. The mixture is then granulated. A pressed monolithic gas generant grain is formed by applying pressure to the granulated mixture. The resulting pressed monolithic gas generant grain has an actual density of at least about 95% of the maximum theoretical density of the gas generant. In some aspects, the mixture is compacted by applying pressure of at least about 40,000 PSI (about 275 MPa) to the gas generant by the use of powder densification equipment (other presses or Roll compaction) prior to granulating the mixture. The methods herein described permit "tuning out" of the lot to lot performance variation. Such a manufacturing process further creates a desirable monolithic grain that meets all of the performance and effluent requirements.

Figure 4:
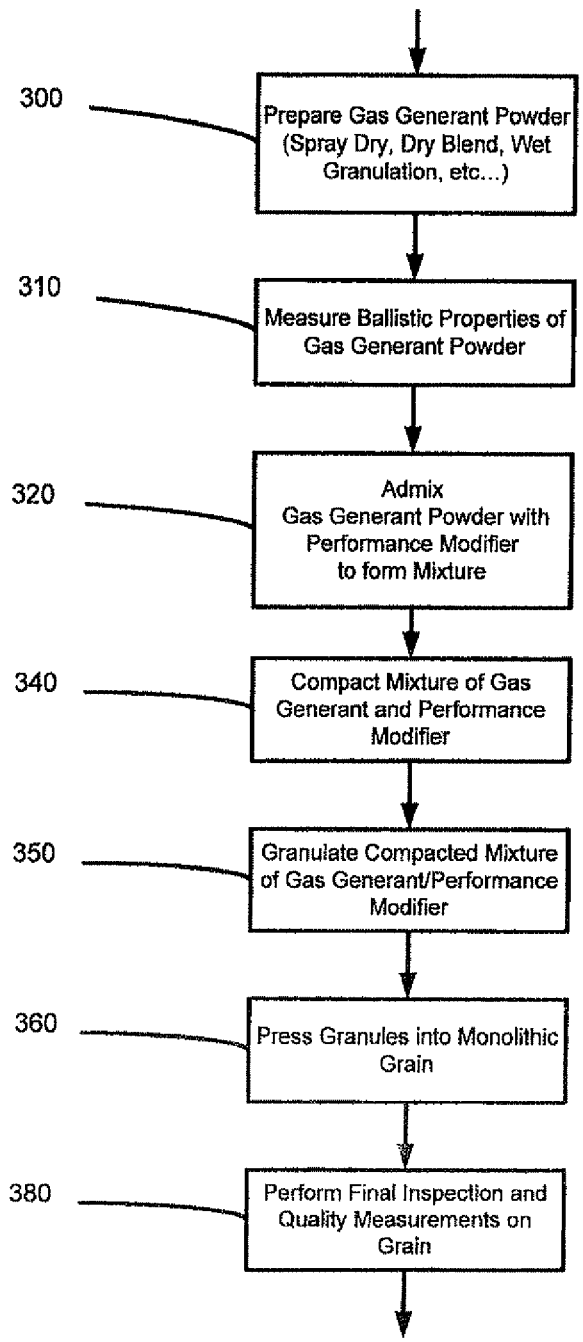
FIG. 4 is a process flow chart illustrating one aspect of the present disclosure.

FIG. 4 is a flow chart demonstrating certain aspects of the methods of the disclosure. Gas generant raw materials are used to prepare gas generant material at 300. The various gas generant raw materials will be discussed in more detail below; however, such components typically include at least one fuel and at least one oxidizer. In certain aspects, the gas generant powder is prepared at 300 via one or more of the following processes: spray drying, dry blending, and wet granulation. In certain aspects, the powder preparation and processing is conducted by creating a slurry by distributing and thoroughly mixing the several raw material components in water and/or a hydrophilic solvent, followed by drying (e.g., spray drying). Such processes for forming powderized and/or granulated gas generants are merely exemplary and are well known to those of skill in the art. In certain alternate aspects, preparation of the gas generant powder is unnecessary as the gas generants are commercially available and/or otherwise prepared in advance. Where the gas generant powder preparation is conducted, quality control and the formation of an intimate mixture of the several gas generant ingredients (raw materials) can be ensured, thereby increasing the burning rate of the gas generant formulation. Further, preparation of the gas generant powder 300 enables safe handling of sensitive ingredients by dilution with other gas generant materials.

FIG. 4 shows that after preparing the gas generant powder, one or more ballistic properties of the gas generant material can be determined by measuring and/or testing the gas generant at 310. One or more of such measurements of the gas generant materials can be obtained, i.e., step 310 can be repeated. Such measurements can be desirable because raw material batches and processing variables can cause inherent lot to lot ballistic variability. Ballistic properties that can be tested include burn rate, linear burn rate, and/or gas yield. In certain aspects, one or more of such measurements are selected from the group consisting of: heat of explosion (HEX) and material density (mass/volume). The heat of explosion is usually defined as the energy released by burning a material in an inert atmosphere (e.g., 20 atm $N_2$), which is then cooled to ambient temperature in a fixed volume, as is well known to those of skill in the art. Hence, the measurement of one or more ballistic properties informs a determination of the amount of gas generant to be added to a predetermined volume of monolithic gas generant. As such, these measurements permit comparison to desired baseline target values for each parameter for an exemplary desired monolithic gas generant grain, thus enabling tuning of the performance characteristics of the gas generant grain by varying a concentration of the gas generant and one or more ballistic performance modifying agents. A ballistic performance modifier is an agent that modifies one or more ballistic properties of the gas generant grain, for example, cooling the flame temperature, increasing the burn rate, and the like. The amount of performance modifier is adjusted to achieve uniform ballistic performance from batch to batch. Thus, determining one or more ballistic properties of a performance modifier is also useful for predicting ballistic performance of the mixture of gas generant and ballistic performance modifier. Such performance modifying agents will be described in more detail below.

The gas generant powder is admixed with a ballistic performance modifier at 320. The admixing at 320 optionally includes introducing a first amount of gas generant and a second amount of ballistic performance modifier. The first amount of gas generant and the second amount of ballistic performance modifier relates to the ballistic properties of the gas generant material that are determined in step 310, and optionally based on a determination of one or more ballistic properties of the performance modifier (which may be obtained from a manufacturer or by testing). In various aspects, the mixing is conducted so that the gas generant and the performance modifier are well mixed, preferably homogeneously mixed, to form a mixture, preferably a homogeneous mixture. Other materials for the gas generant grain can optionally be added and admixed with the gas generant powder at 320. For example, in certain aspects, the mixture comprises a press release aid agent, which is introduced to the gas generant and performance modifier prior to or during the admixing process.

At 340, the mixture of gas generant and performance modifier is compacted followed by granulation of the compacted mixture 350. In various aspects, the mixture is compacted by granulation by the use of powder densification equipment, such as presses or roll compaction equipment well known to those of skill in the art. In various aspects, a minimum pressure for densification applied to the mixture is about 40,000 psi (275 MPa). In certain aspects, the compaction prior to granulation is optional. The compaction 340 and/or granulation 350 steps serve to densify the mixture so that it can be charged into the die prior to pressing and moreover, the compaction/granulation processes can cause certain gas generant raw materials to flow under pressure. In certain aspects, this flow of raw material is desirable because it incorporates the dry blended performance modifier into a matrix of the gas generant, thus preventing segregation of components later in the process. In this respect, certain water-soluble co-fuels, such as guanidine nitrate or dicyandiamide act as a non-polymeric binder in the gas generant grain.

After the granulation at 350, the granulated mixture is introduced or charged into a die cavity (a die or a mold), where an applied force or pressure compresses the granulated materials to form a desired monolithic grain shape. Thus, the granules are pressed into a monolithic grain by application of pressure at step 360. In certain aspects, the pressing forms the mixture into a desired shape that permits the inflator to perform in the prescribed manner. In accordance with various aspects of the disclosure, a pressed monolithic gas generant grain is formed which has a high density, a high strength to withstand environmental conditions and ignition, consistency of shape from grain to grain, and the absence of flaws in the grain such as cracks, chips, voids, and the like.

In some aspects, the forming of the pressed gas generant grain is conducted in a hydraulic press where a granulated mixture is introduced into a die cavity. The application of pressure can be achieved by any pressing operation that provides the necessary applied compression force, as known to those of skill in the art, and is not limited to hydraulic pressing. By way of background, FIGS. 5A-5F depict stages of an exemplary pressing process using a simplified depiction of a hydraulic press 400 for forming a gas generant grain. The hydraulic press 400 comprises an upper hydraulic cylinder 402 and a lower hydraulic cylinder 404. An upper platen 406 is attached to the upper hydraulic cylinder 402. Similarly, the lower hydraulic cylinder 404 is attached to a lower platen 408. An upper punch 410 is attached to the upper platen 406. A lower punch 412 is attached to the lower platen 408. A stationary die 414 is mounted to a bottom portion (not shown) of the hydraulic press 400. A plurality of core pins 416 is also mounted to the bottom portion of the press 400. The pins 416 create void space or apertures within a gas generant material (420 of FIG. 5C) as pressure is applied; resulting in the formation of one or more apertures (422 of FIG. 5F) in a gas generant grain (424 of FIG. 5F).

Figure 5:
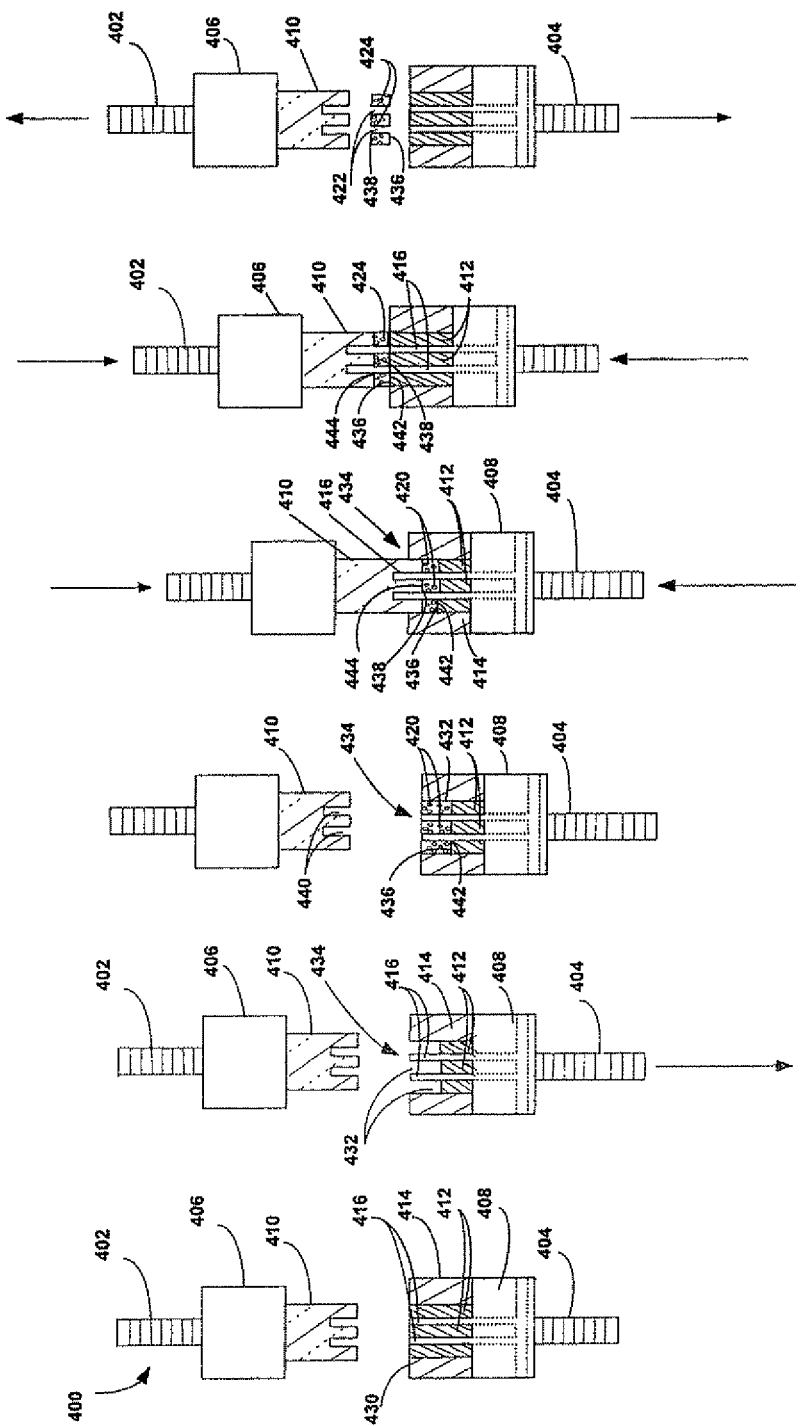
FIGS. 5A to 5F show sectional views of stages of forming a gas generant grain employing a hydraulic press, a die, as well as upper and lower punches, in accordance with various aspects of the present disclosure.

The lower punch 412 moves in a vertical direction around the plurality of core pins 416. In FIG. 5A, the core pins 416 are flush with an upper surface 430 of the die 414. Similarly, the lower punch 412 is also flush with the upper surface 430 of the die 414.

In FIG. 5B, lower cylinder 404 moves the lower punch 412 to a pre-determined lower position, thereby creating a void region 432 that has a suitable predetermined volume, to which a gas generant material (420 of FIG. 5C) can be added. A feed shoe (not shown) containing granulated gas generant material moves over a central region 434 of the die 414 to fill the void region(s) 432 with a gas generant material 420, as shown in FIG. 5C. Any excess gas generant material 420 outside the central region 434 of the die 414 is removed. FIG. 5C shows gas generant material 420 occupying the void regions 432 in the central region 434 of the die 414. A first side 436 of the gas generant material 420 contacts the lower punch 412.

In FIG. 5D, the upper cylinder 402 moves the upper punch 410 into contact with the gas generant material 420 within the die 414. The upper punch 410 contacts a second surface 438 of the gas generant material 420. The upper punch 410 has a plurality of apertures 440 (FIG. 5C) that are adapted to receive the plurality of core pins 416. The upper punch 410 and the lower punch 412 are forced towards one another to apply force to the gas generant material 420. In this manner, pressure is applied to gas generant material 420 by the upper and lower punches 410, 412 via the upper and lower hydraulic cylinders 402, 404, thereby compressing the gas generant material 420 for a time and pressure that forms the consolidated monolithic gas generant grain (424 of FIG. 5F).

In certain aspects, the methods of the disclosure optionally include a pre-compression cycle, where an applied force is exerted by the upper and/or lower punches 410,412 onto the gas generant material 420 at a lower pressure than a peak consolidation pressure. Such a pre-pressing step allows for deaeration of the gas generant material 420 in controlled manner, thus improving the physical properties of the pressed monolithic gas generant grain 424, such as density and strength. The pre-press dwell pressure applied by the upper and lower punches 410, 412 via the upper and lower cylinders 402, 404 is optionally greater than about 5,000 psig (about 35 MPa), in some aspects, greater than about 10,000 psig, (about 70 MPa), and optionally about 14,000 psig (about 96 MPa). In some aspects, the pre-press dwell pressure is less than about 20,000 psig (about 138 MPa). In certain aspects, the pre-press dwell time is greater than about 0.1 seconds and less than about 3 seconds.

In FIG. 5D, the upper punch 410 protrudes into the central region 434 of the die 414 and contacts the gas generant material 420 at the second surface 438. A maximum pressure applied to the gas generant material 420 during grain formation is referred to as consolidation pressure. A consolidation pressure dwell time is the period during which the peak consolidation pressure is applied. Thus, in certain aspects, the disclosure provides a method of forming a monolithic grain 424 comprising applying pressure to a granulated gas generant material mixture 420 charged into a die cavity 414, where the pressure is applied along a first side 436 of the gas generant material mixture 420 at a first contact surface 442 of the lower punch 412 and also along a second side 438 at a second contact surface 444 of the upper punch 410 to form the pressed monolithic grain 424.

The consolidation pressure is the maximum pressure which is applied to form the grain 424. In certain aspects of the disclosure, the consolidation pressure is greater than about 50,000 psig (about 345 MPa), optionally greater than about 90,000 psig (about 620 MPa), although optionally can be greater than 90,000 psig (about 620 MPa). Thus, in certain aspects, the consolidation pressure ranges from about 50,000 psi (about 345 MPa) to about 70,000 psi (about 480 MPa), and optionally greater than about 90,000 psi (about 620 MPa). A dwell-time of the upper and lower punches 410, 412 at the consolidation pressure is preferably greater than about 0.1 seconds. In certain aspects, the dwell time at peak consolidation pressure is less than about 5 seconds.

In FIG. 5E, the lower punch 412 is raised such that the first contact surface 436 is flush with and/or raised above the upper surface 430 of the die 414. At the same time, the upper punch 410 is likewise raised above the upper surface 430. In a conventional grain formation process, little or negligible pressure is applied by the upper punch 410 to the grain 424 as the grain 424 is ejected, as the lower punch 412 typically raises and expels the grain 424 from the die 414 while the upper punch 410 is quickly raised out of contact with the grain 424 to provide clearance for grain 424 to be removed.

In some aspects of the methods of the disclosure, the pressed monolithic grain 424 is released or ejected from the die 414 by moving the upper and lower punches 410, 412 in the same direction (e.g., up and out of the central region of the die above the upper die surface 430), while still applying pressure to both the upper and lower punches 410, 412. Thus, the upper punch 410 moves at a slightly faster speed than the lower punch 412, while both punches 410, 412 travel in the same (upward) direction, while still maintaining axial pressure on the grain 424 as it is removed from the die 414 and the core pins 416.

In this manner, a greater pressure is applied along the first side 436 (via the first contact surface 442 of the lower punch 412) to raise the grain 424 above an upper surface 430 of the die 414 and to remove the grain 424 from the die 414. The pressure can be maintained on the grain 424 along the second side 438 (via the second contact surface 444 with the upper punch 410), while pressure is concurrently being applied along the first side 436. In certain aspects, the applied pressure is maintained on the first and second sides 436, 438 of the grain 424 during at least a portion of the time that the grain 424 is being ejected from the die 414. In certain aspects, pressure is maintained on the first side and second sides 436, 438 of the grain 424 while the pins 416 are removed from the grain 424.

While not intending to be bound by any particular theory, it is believed that applying force to the grain from opposing sides during ejection of the gas generant grain from the die (i.e., maintaining the pressure on both the first side 436 and the second side 438 of the grain 424 as it is released from the die 414 and/or while the pins 416 are removed), provides improved monolithic gas generant grains having high density, superior strength, and minimized density gradients. In certain aspects, the pressure during a portion of release or ejection on the second side 438 is greater than or equal to about 3,000 psig. The ejection pressure at the upper contact surface 444 optionally ranges from greater than about 3,200 psig to about 6,700 psig. Thus, by fulfilling the minimum press requirements (consolidation pressure, dwell time at consolidation pressure, pre-press pressure, and/or pre-press dwell time) the desired high density monolithic gas generant grains of the disclosure are achieved.

In certain alternate aspects, the pins 416 are attached to a third cylinder (not shown), which is moved independently of the first and second cylinders 402, 404. In such an embodiment, the pins 416 or core rods "float." When the grain 424 is being removed from the die 414, the pins 416 or core rods move up with the grain 424 and lower punch 412. When the lower punch 412 is flush with the upper contact surface 444 the pins 416 are lowered by the third cylinder and thus removed from the grain 424.

FIG. 5F shows a sectional view of the pressed monolithic gas generant grain 424 having apertures 422 as it is removed from the press. The steps in FIGS. 5B-5F are then repeated to form additional pressed monolithic gas generant grains.

In some embodiments, a press release aid agent is added to the gas generant material mixture (as described above during granulation and/or admixing) or alternately, directly onto the tooling surfaces, such as the inner surface of the die cavity, punches, and/or pin surfaces, to facilitate removal of the grain after consolidation, thereby reducing release forces on the grain. Examples of suitable press release aid agents include graphite, magnesium stearate, calcium stearate, and mixtures thereof as are well known to those of skill in the art. The concentration of press release aid agent is generally related to the equivalent release force from the die. For example, graphite can be added at concentrations in the gas generant material of greater than about 0.1% by weight up to 2% by weight. In certain aspects, the graphite is present at about 0.5% by weight. The magnesium stearate is optionally present in the gas generant material at about 0.5% to about 3%, optionally about 1% by weight. In some aspects, a beneficial press release aid agent comprises graphite, as graphite is non-combustible in many pyrotechnic composition applications and desirably does not contribute to effluent levels from the gas generant grain during combustion, such as CO generation.

Various aspects of the disclosure provide forming a gas generant having a monolithic grain shape tailored to create rapid heated gas. Exemplary grain shapes and related details are addressed in commonly assigned U.S. Ser. No. 11/472,260 (filed Jun. 21, 2006) to Mendenhall, et al. Suitable examples of gas generant compositions having desirable burn rates, density, and gas yield for inclusion in the gas generants manufactured in accordance with the present disclosure include those described in commonly assigned U.S. Pat. No. 6,958,101 to Mendenhall et al. However, any suitable fuels known or to be developed in the art that can provide gas generants having the desired burn rates, gas yields, and density described above are contemplated for use with the teachings of the present disclosure. The disclosures of U.S. Ser. No. 11/472,260 and U.S. Pat. No. 6,958,101 are incorporated by reference as if fully set forth herein.

As discussed above, in accordance with various aspects of the present disclosure, the gas generant manufactured in accordance with the present disclosure is substantially free of polymeric binder. A gas generant material that is substantially free of polymeric binder has sufficient burn rates and combustion gas products such that it can also be substantially free of perchlorate-containing oxidizing agents (for example, ammonium perchlorate and/or potassium perchlorate). In such embodiments, a gas generant comprises less than about 5% by weight perchlorate-containing oxidizing agent, more preferably less than about 4% by weight, optionally less than about 3% by weight, optionally less than about 2% by weight, optionally less than about 1% by weight perchlorate-containing oxidizing agent, and in certain embodiments comprises 0% by weight of the perchlorate-containing oxidizing agent.

While in certain aspects it is preferred that the gas generant compositions manufactured in accordance with the present disclosure are substantially free of polymeric binders, in certain alternate aspects, the gas generant compositions optionally comprise low levels of certain acceptable binders or excipients to improve crush strength, while not significantly harming effluent and burning characteristics. Such excipients include microcrystalline cellulose, starch, carboxyalkyl cellulose, e.g., carboxymethyl cellulose (CMC), by way of example. When present, such excipients can be included in alternate gas generant compositions at less than 10% by weight, preferably less than about 5% by weight, and more preferably less than about 2.8%.

If desired, a gas generant composition manufactured in accordance with various aspects of the present disclosure may optionally include additional components such as: perchlorate-free oxidizing agents, slag forming agents, coolants, flow aids, viscosity modifiers, pressing aids, dispersing aids, phlegmatizing agents, excipients, burning rate modifying agents, and mixtures thereof. Such additives typically function to improve the stability of the gas generant material during storage; modify the burn rate or burning profile of the gas generant composition; improve the handling or other material characteristics of the slag which remains after combustion of the gas generant material; and improve ability to handle or process pyrotechnic raw materials.

Certain undesirable oxidizing agents can be avoided in the gas generant compositions manufactured in accordance with the present disclosure. For example, in certain embodiments, the gas generant manufactured in accordance with the present disclosure is substantially free of perchlorate-containing oxidizing agents. In one aspect, a suitable perchlorate-free oxidizing agent for use in the gas generant comprises a basic metal nitrate, such as basic copper nitrate. Basic copper nitrate has a high oxygen to metal ratio and good slag forming capabilities. Such perchlorate-free oxidizing agents can be present in an amount of less than or equal to about 50 weight % of the gas generant composition.

Other suitable additives include slag forming agents, flow aids, viscosity modifiers, pressing aids, dispersing aids, or phlegmatizing agents that can be included in the gas generant composition. The gas generant compositions optionally include a slag forming agent, such as a refractory compound, e.g., aluminum oxide and/or silicon dioxide. Generally, such slag forming agents may be included in the gas generant composition in an amount of 0 to about 10 weight % of the gas generant composition.

Figure 6:
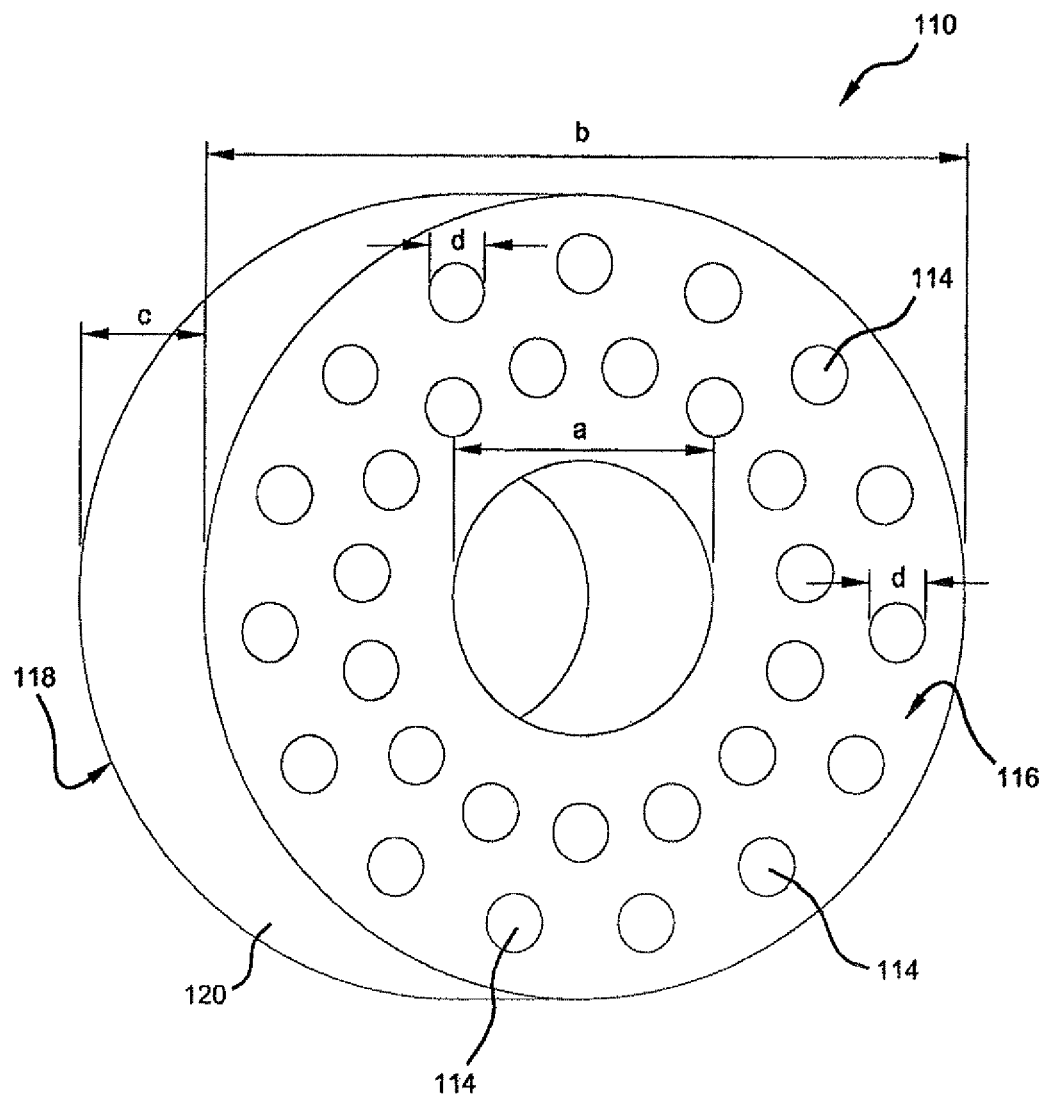
FIG. 6 is an isometric view of a pressed monolith gas generant manufactured in accordance with the principles of the present disclosure.

A ballistic performance modifier admixed with the gas generant composition alters the ballistic performance during combustion. The performance modifier is selected to create a standard ballistic performance of the overall gas generant grain (thus minimizing variations between lot productions), thus it may minimize or enhance certain ballistic performance characteristics of the gas generant material. In one example, the ballistic performance modifier is a coolant for lowering gas temperature, such as basic copper carbonate or other suitable carbonates, which is optionally added to the gas generant at 0 to about 20% by weight of the total mixture. Other suitable ingredients that can be added as performance modifiers alter the burn profile of the pyrotechnic fuel material by modifying pressure sensitivity of the burning rate slope. One such example is copper bis-4-nitroimidazole. Agents having such an affect are referred to as "pressure sensitivity modifying agents" and are optionally present in the mixture at 0 to about 10% by weight. Such additives are described in more detail in U.S. patent application Ser. No. 11/385,376, entitled "Gas Generation with Copper Complexed Imidazole and Derivatives" to Mendenhall et al., the disclosure of which is herein incorporated by reference in its entirety. Other additives known or to be developed in the art as ballistic performance modifiers and/or pyrotechnic gas generant compositions are likewise contemplated for use in various embodiments of the present disclosure, so long as they do not unduly detract from the desirable burn profile characteristics of the gas generant compositions FIG. 6 depicts a single pressed monolithic gas generant grain shape 110 similar to that disclosed in U.S. patent application Ser. No. 11/472,260 incorporated by reference above. The combustion pressure resulting from the burning of a monolithic annular disk grain shape 110 such as that shown in FIG. 6 is distinct from that of a conventional pellet (cylindrical shape) or wafer (a toroidal ring shape).

The monolithic grain shape 110 shown in FIG. 6 is an annular disk. Exemplary dimensions of the grain shape 110 are an inner diameter "a" of about 14 mm, an outer diameter "b" of 41 mm, and a height "c" of about 22 mm. A plurality of apertures 114 extend from a first side 116 of the gas generant grain 110 to a second side 118 of the gas generant grain 110, thus providing open channels through the body 120 of the grain 110 that extend therethrough. As shown, each aperture 114 has a diameter "d" of about 3 mm. The gas generant grain 110 as shown has 30 apertures 114, although different configurations, dimensions, and quantities of the apertures 114 are contemplated. The number, size, and position of the apertures 114 may be varied, as they relate to the desired initial surface area and specific burn rate of the gas generant material. Similarly, the dimensions (a, b, and c) of the disk can also be varied, as appreciated by skilled artisans. For example, where multiple disks are employed as gas generant, the height "c" can be reduced.

The initial surface area of this grain shape 110 is relatively low, as compared to conventional pellet or wafer shapes, however, the burn rate of the gas generant material is sufficiently high to permit a low initial surface area that burns rapidly to expose additional surface area as the combustion reaction progresses. The initial surface area of the shape of the gas generant grain 110 as shown in FIG. 6 is less than 12,000 mm$^2$, specifically it is about 11,930 mm$^2$. In various embodiments, an initial surface area of the grain shape is less than about 13,000 mm$^2$. Traditional pellet shapes possess a higher initial surface area, for example greater than about 35,000 mm$^2$, inter alia, to achieve the necessary burn rate and gas combustion pressure to inflate an airbag cushion appropriately.

In accordance with the present disclosure, a ratio of the length of each aperture to the diameter (L/D) is preferably from about 3.5 to about 9. In certain embodiments, the maximum ratio of L/D is 7.5. In the specific example shown in FIG. 6, the L/D ratio of each aperture is about 7.3. The ratio of L/D of the plurality of apertures relates to the surface area progression and overall burning behavior of the gas generant. The number of apertures and the ratio of L/D of each aperture relate to the shape or profile of the combustion pressure curve of the gas generant material.

The profile of the combustion pressure curve relates to the improved protection for occupants and it is preferable that the combustion pressure curve is progressive to neutral, in accordance with desired ballistic behavior for gas generant grains. The comparative conventional materials typically have regressive combustion pressure curves. The profile of this pressure curve relates to the amount of surface area of the gas generant which correlates to the mass of generant reacting, hence the mass gas generation rate (mg) and pressure of gas generated over time. In this regard, a monolithic shape of the gas generant grain 110, similar to that shown in FIG. 6, provides a controlled combustion pressure that provides longer, controlled, and sustained combustion pressure at desired levels which is important for improving inflator effluent properties and for occupant safety during deployment of the airbag cushion.

This concept can also be expressed as a "rise rate" which is the rate at which the gas output from an inflator increases pressure (usually measured when the gas output is directed to a closed volume). It is commonly desirable that an inflatable restraint airbag cushion initially inflates in a relatively gradual manner to reduce injury to an occupant (particularly where the occupant is too close to the airbag or "out-of-position") which is then followed by a period where the inflation gas passes into the airbag cushion at a relatively greater or increased pressure rate. A gas generant that creates such inflation is commonly referred to in the art as producing inflation gas in an "S" curve. The gas generants formed in accordance with certain principles of the present disclosure approach a rise rate having an S curve, which is highly desirable, particularly for out-of-position occupants. These features will be described in greater detail in the context of FIG. 6.

In accordance with aspects of the various embodiments of the present disclosure, a monolithic pressed grain design provides a lower rise rate, while providing a higher average combustion pressure and superior control over the burning characteristics. Additionally, in preferred embodiments, the absence of polymeric binder and/or perchlorate oxidizing agents in the gas generant as compared to conventional extruded monolithic grains improves burning characteristics and effluent.

As discussed above, the monolithic gas generants provide improved effluent quality. This may be attributed to several aspects of the high density monolithic grains, including that the gas generant composition is substantially free of polymeric binder and associated co-oxidizers such as perchlorates which raise the combustion flame temperature. Where combustion temperatures are higher, it has generally been observed that higher combustion temperatures result in greater levels or relative amounts of carbon monoxide (CO) and nitrogen oxides (NO$_x$) combustion products, for example. In various aspects, a maximum combustion temperature (also expressed as flame temperature) is optionally less than about 2,300 K, for example, the flame temperature during combustion is about 1400 K to about 2300 K. In certain aspects, the flame temperature is optionally less than about 2,000 K.

Table I compares effluent generated from a conventionally shaped gas generant in the form of a pellet with a pressed monolithic annular disk shaped gas generant similar to that shown in FIG. 6, each formed of the same gas generant composition having about 28% guanidine nitrate, about 13% basic copper nitrate, about 4% basic copper carbonate, about 3% silicon dioxide, and about 52% basic copper aminotetrazole nitrate. The U.S. Council for Automotive Research (US-CAR) issues guidelines for maximum recommended levels of effluent constituents in airbag devices. Desirably, the production of these effluents is minimized to at or below these guidelines. The current USCAR guidelines for total in vehicle restraint devices are included in Table I. Also, ¼ of the USCAR driver-side guidelines for effluent constituents (25% of the recommended levels) are included as the usual driver-side apportionment.

Table I shows effluent analysis during combustion of the gas generant by Fourier Transform Infrared Analysis (FTIR) showing that the nitrogen oxide species, which includes NO, NO$_2$, and NO$_x$ effluent gases are reduced and hence improved. As can be observed, a total amount of nitrous oxide species in the effluent is reduced by an amount of at least about 50% as compared to the pellet grain. For example, nitric oxide is reduced by about 68% and nitrogen dioxide by at least 50%. Nitrous oxide remains below the detection limit for both gas generants. Additionally, the particulate species generated in the effluent is also reduced.

Further, the effluent is substantially free of chloride species, such as HCl, as the gas generant is substantially free of perchlorate-containing oxidizing agents. Carbon monoxide and ammonia levels are substantially the same, which demonstrates improvement of certain effluent constituents without any detrimental increase with respect to other constituents. As can be seen from the data, monolithic grains having a neutral to progressive surface for a substantial portion of generant burn produce effluent constituents that are below ¼ of the USCAR guidelines, as where the traditional gas generant pellets having a highly regressive surface area exceed ¼ of the USCAR guidelines on some effluent constituents. Thus, the monolithic gas generant grains demonstrate a beneficial overall reduction in various effluent constituents versus traditional gas generant grains having regressive surface areas and therefore low average combustion pressures. Effluent particulate output is also substantially decreased relative to traditional gas generant shapes, such as pellets.

TABLE I

| EFFLUENT SPECIES | PELLET (ppm) | MONOLITHIC (ppm) | USCAR Guideline (ppm) | ¼ USCAR Guideline (ppm) |
|---|---|---|---|---|
| Carbon Monoxide | 93 | 94 | 460 | 115 |
| Carbon Dioxide | 1,401 | 1,465 | 30,000 | 7,500 |
| Nitric Oxide | 35 | 11 | 75 | 18.75 |
| Nitrogen Dioxide | 2 | <1 | 4 | 1 |
| Nitrous Oxide | <43 | <43 | NA | NA |
| Ammonia | 6 | 7 | 35 | 8.75 |
| Particulate | 40 | 26 | 125 | 31.25 |

Other benefits of the monolithic grains formed in accordance with the present disclosure include simplification of hardware in the assembly of module. Many current inflatable restraint assemblies have a two-stage driver inflator, where two distinct gas generants are staged in an inflator device. The first gas generant has a burn rate and gas yield that provide sufficient gas product to inflate the airbag cushion for a first burning period, but are insufficient to sustain the cushion pressure for the required time through the entire impact/crash period. As such, a second gas generant (sometimes having a different composition) is ignited in a second stage, where it provides pressurized gas product to the bag for a second period during the impact. Such staging can also be used to proportionally respond to impact forces during collision, depending on the severity of the crash. However, two-stage drivers have complex mechanical hardware and control systems and are costly. Further, the dual gas generants can result in uncontrolled sympathetic ignition reactions.

For example, a common configuration for dual stage drivers includes nesting a second igniter system within a first igniter system. The dual igniters create redundancy for various hardware components, including containment equipment, electrical wiring, initiators, shorting clips, staging cups, lids, more complicated bases, and the like. Further, another gas generant loading station is required for the additional stage of generant. During operation, the control of combustion pressure during the second stage of firing is difficult because the first stage may still be firing and/or has already heated the surrounding area with pressurized gas. The flow area between the lid and cup can be inconsistent and combustion pressure can be difficult to control from the second stage. Moreover, complications can potentially occur by leakage of combustion gas from the first stage into the nestled second stage, where unintentional burning of the second stage generant can occur.

In accordance with various embodiments of the present disclosure, a monolithic pressed gas generant is suitable for a single-stage driver inflatable restraint device, as the gas generant grain has a rapid reaction rate and sufficient sustained combustion pressure to eliminate any need for multiple stages of inflation without endangering occupants in an out-of-position (OOP) condition. Thus, all of the above described hardware and complications can be avoided via the use of the improved gas generants in a single stage according to various embodiments of the present disclosure. Thus, grain shapes similar to those of FIG. 6 can be used in a single stage inflator to provide superior OOP performance without the need for second stage operation and associated complex hardware.

The embodiments of the present disclosure can be further understood by the specific examples contained herein. Specific examples are provided for illustrative purposes of how to make and use the compositions and methods of the present disclosure and, unless explicitly stated otherwise, are not intended to be a representation that given embodiments of this present disclosure have, or have not, been made or tested.

Example 1

In one example, a coolant (basic copper carbonate) is dry blended with a spray dried, gas generant composition. The blended powder is then compacted either by roll compaction or soft-pressing on a rotary pharmaceutical press. The blended powder is compacted with an applied pressure of at least about 40,000 psig (about 275 MPa), and then granulated to increase it's bulk density so that proper die fill is achieved. By this process, bulk density is increased to between about 0.75 and 1.75 g/cc. The pre-compacted powder is then blended with a release agent such as graphite and placed in a pre-formed die having the desired shape, such as the annular disk shape with a plurality of apertures, as shown in FIG. 6, for example. The die and powders are placed in a large, high tonnage hydraulic press capable of exerting forces in excess of 50 tons. The raw materials are pressed to form a monolithic gas generant solid.

Various embodiments of the present disclosure provide methods of making a monolithic gas generant grain for use in an inflatable restraint device that provides an initial surface area that is low as compared to conventional wafers and pellets, thus improving OOP behavior. As the monolithic grain burns, surface area increases, maintaining or even improving total occupant restraint, where monolithic gas generant grains have considerably higher average combustion pressure than traditional gas generant pellets or wafers. Further, the methods of the disclosure provide an industrially practical way of mass production of monolithic gas generant grains. Additionally, the methods of the disclosure include controlling performance variation from lot to lot, while improving performance characteristics.

Further improvement in effluent quality is achieved by other aspects of certain embodiments of the present disclosure, where gas generant grains are formed by pressing the monolithic grain, as opposed to extruding the gas generant formulation. In this regard, the gas generant grain is substantially free of polymeric binder and has robust stability due to formation by application of compressive strength. In certain embodiments, the actual density of the gas generant grain is greater than 95% of the maximum theoretical density. The burn rate, combustion profile, effluent quality, strength and durability, including the ability to withstand environmental conditions and ignition, and durability and integrity of the grain, including avoidance of cracks, chips, voids, and other flaws, are significantly improved when formed in accordance with the principles of the present disclosure.

The present disclosure still further provides pyrotechnic compositions that are economical to manufacture and provide a consistent shape and pyrotechnic composition between different production lots. The present disclosure additionally provides a burn rate enhanced gas generant grain that overcomes one or more of the limitations of conventional gas generants.

What is claimed is:

1. A method for forming a monolithic gas generant grain comprising:
   admixing a pre-formed gas generant material comprising a water-soluble fuel with a ballistic performance modifier to form a mixture;
   granulating said mixture; and
   forming a pressed monolithic gas generant grain by applying pressure to said granulated mixture, wherein said water-soluble fuel incorporates said performance modifier into the monolithic gas generant grain, wherein said pressed monolithic gas generant grain has an actual density of at least about 95% of the maximum theoretical density of the gas generant.

2. The method of claim 1, wherein said gas generant grain is an annular disk having a plurality of apertures with a ratio of length to diameter of about 3.5 to about 8, wherein an initial surface area of the disk is less than about 13,000 mm$^2$ and a linear burn rate of the gas generant grain is greater than or equal to about 1.6 inches per second at a pressure of about 3,000 pounds per square inch, a product of a mass density and a gas yield of the gas generant grain is greater than or equal to about 5.0 moles/100 cm$^3$, and wherein the gas generant grain is substantially free of polymeric binder.

3. The method of claim 1, wherein prior to said granulating, said mixture is compacted by applying a compressive force of at least about 40,000 psig (275 MPa).

4. The method of claim 1, wherein prior to admixing, said pre-formed gas generant material is prepared by forming a gas generant powder via one or more of the following processes: spray drying, dry blending, and wet granulation.

5. The method of claim 1, wherein prior to said admixing, one or more ballistic properties of said pre-formed gas generant material is determined.

6. The method of claim 5, wherein said admixing includes admixing a first amount of pre-formed gas generant material with a second amount of ballistic performance modifier, wherein said first amount of pre-formed gas generant material and said second amount of ballistic performance modifier relates to said one or more ballistic properties of said pre-formed gas generant material.

7. The method of claim 1, wherein said forming of said pressed gas generant grain further comprises:
   introducing said granulated mixture into a die cavity, wherein said granulated mixture has a first side and a second side opposite to said first side;
   said applying of pressure includes applying pressure to said granulated mixture along said first side and said second side to form said pressed monolithic grain; and
   ejecting said pressed monolithic grain from said die by applying a greater pressure on said first side than on said second side to force said grain from the die, while maintaining an applied pressure on said second side during a portion of said ejecting, wherein said applied pressure on said second side is greater than or equal to about 3,000 psig (about 21 MPa).

8. The method of claim 7, further comprising applying a press release agent to at least one of a surface of said die cavity, said first side and said second side.

9. The method of claim 1, wherein the gas generant mixture has a mass density of greater than or equal to about 1.9 g/cm$^3$ and a gas yield of greater than about 2.4 moles per 100 g of gas generant.

10. The method of claim 1, wherein the gas generant mixture is substantially free of polymeric binders and perchlorate-containing oxidizing agents.

11. The method of claim 1, wherein the generant is a pressed monolithic grain in the form of an annular disk comprising one or more apertures, wherein an initial surface area of the disk is less than about 13,000 mm$^2$.

12. The method of claim 1, wherein the gas generant grain has a loading density of at least about 62%.

13. The method of claim 1, wherein said granulated mixture comprises a press release aid agent.

14. The method of claim 1, wherein said admixing comprises introducing a non-polymeric binder to said mixture.

15. A method for forming a monolithic gas generant comprising:
   introducing a gas generant material into a die cavity, wherein the gas generant material in the die cavity has a first side and a second side opposite to said first side;
   applying pressure to said gas generant material along said first side and said second side to form a pressed monolithic grain that has an actual density of greater than or equal to about 95% of the maximum theoretical mass density of the gas generant material; and
   ejecting said pressed monolithic grain from said die by applying a greater pressure on said first side than on said second side to force said grain from the die, while maintaining an applied pressure on said second side during a portion of said ejecting, wherein said applied pressure is greater than or equal to about 3,000 psig (about 21 MPa).

16. The method according to claim 15, wherein the gas generant material further comprises a burn rate modifier and a release agent.

17. The method according to claim 16, wherein said release agent is selected from the group consisting of: graphite, magnesium stearate, calcium stearate, and mixtures thereof.

18. The method according to claim 15, wherein said gas generant material is a powder and said applying of pressure occurs in a first stage and a distinct second stage, wherein said first stage has an applied dwell pressure of less than about 20,000 psig (about 138 MPa) to deaerate said gas generant powder.

19. The method according to claim 15, wherein said applying of pressure between said first side and said second side on the gas generant material creates a consolidation pressure of greater than or equal to about 70,000 psig (about 480 MPa minutes).

20. The method according to claim 15, wherein said applying of pressure between said first side and said second side on the gas generant material creates a peak consolidation pressure of greater than or equal to about 70,000 psig (about 480 MPa) and a dwell time during said peak consolidation pressure from about 0.1 to about 5 seconds.

21. The method according to claim 16, wherein said applying of pressure between said first side and said second side of the gas generant material comprises a pre-pressing stage, wherein and a pre-press dwell time during said pre-pressing stage pressure of about 0.1 to about 3 seconds.

22. The method according to claim 15, wherein said maintaining of applied pressure on said second side during a portion of said ejecting is a pressure ranging from about 3,200 psig (22 MPa) to about 6,700 psig (46 MPa).

23. A method for forming a monolithic gas generant comprising:
   admixing a pre-formed gas generant material comprising a water-soluble fuel with a ballistic performance modifier selected from the group consisting of: a coolant, a pressure sensitivity modifying agent, and combinations thereof, to form a mixture;
   compacting said mixture with an applied pressure of at least about 40,000 psig (about 275 MPa);
   granulating said mixture; and
   forming a pressed monolithic gas generant grain by applying pressure of greater than about 70,000 psi (about 480 MPa) to said granulated mixture, wherein said water-soluble fuel incorporates said performance modifier into said pressed monolithic gas generant grain, wherein said pressed monolithic gas generant grain has an initial surface area of less than about 13,000 mm$^2$, wherein a product of a mass density and a gas yield of the gas generant is greater than or equal to about 5.0 moles/100 cm$^3$, wherein the gas generant grain is substantially free of polymeric binder and has an actual density of at least about 95% of the maximum theoretical density of the gas generant.

24. The method according to claim 1, wherein said ballistic performance modifier is selected from the group consisting of: a coolant, a pressure sensitivity modifying agent, and combinations thereof.

25. A method for forming a monolithic gas generant grain comprising:
   forming a gas generant material comprising a water-soluble fuel via a process selected from the group consisting of: spray drying, dry blending, wet granulation, and combinations thereof;
   after said gas generant material is formed, admixing said gas generant material with a ballistic performance modifier to form a mixture;
   granulating said mixture; and
   forming a pressed monolithic gas generant grain by applying pressure to said granulated mixture, wherein said water-soluble fuel incorporates said performance modifier into said pressed monolithic gas generant grain, wherein said pressed monolithic gas generant grain has an actual density of at least about 95% of the maximum theoretical density of the gas generant.

26. The method of claim 25, wherein said ballistic performance modifier is selected from the group consisting of: a coolant, a pressure sensitivity modifying agent, and combinations thereof.

\* \* \* \* \*